United States Patent
Menchik et al.

(10) Patent No.: US 12,030,238 B2
(45) Date of Patent: Jul. 9, 2024

(54) 3D PRINTING TO OBTAIN A PREDEFINED SURFACE QUALITY

(71) Applicant: Stratasys Ltd., Rehovot (IL)

(72) Inventors: Guy Menchik, RaAnana (IL); Yaniv Shitrit, Ashkelon (IL); Boris Belocon, Rehovot (IL); Yehoshua Sheinman, RaAnana (IL); Daniel Dikovsky, Ariel (IL)

(73) Assignee: Stratasys Ltd., Rehovot (IL)

( * ) Notice: Subject to any disclaimer, the term of this patent is extended or adjusted under 35 U.S.C. 154(b) by 439 days.

(21) Appl. No.: 16/957,819

(22) PCT Filed: Dec. 17, 2018

(86) PCT No.: PCT/IL2018/051364
§ 371 (c)(1),
(2) Date: Jun. 25, 2020

(87) PCT Pub. No.: WO2019/130294
PCT Pub. Date: Jul. 4, 2019

(65) Prior Publication Data
US 2021/0060850 A1 Mar. 4, 2021

Related U.S. Application Data

(60) Provisional application No. 62/612,454, filed on Dec. 31, 2017.

(51) Int. Cl.
*B29C 64/112* (2017.01)
*B29C 64/245* (2017.01)
(Continued)

(52) U.S. Cl.
CPC .......... *B29C 64/112* (2017.08); *B29C 64/245* (2017.08); *B29C 64/393* (2017.08);
(Continued)

(58) Field of Classification Search
CPC ... B29C 64/106; B29C 64/205; B29C 64/245; B29C 64/209; B29C 64/214; B29C 64/218; B29C 64/357; B33Y 30/00
See application file for complete search history.

(56) References Cited

U.S. PATENT DOCUMENTS 7,964,439 B2 * 6/2011 Kim ................. H10K 71/13
438/455
8,070,473 B2 * 12/2011 Kozlak ................. B29C 64/118
425/150
(Continued)

FOREIGN PATENT DOCUMENTS

DE 19957370 C2 * 3/2002 ............... B05D 1/18
DE 102014201121 7/2015
(Continued)

OTHER PUBLICATIONS

Patent Translate, "Description DE102016224870A1", Sep. 8, 2022, EPO and Google. (Year: 2022).*
(Continued)

*Primary Examiner* — Timothy Kennedy

(57) ABSTRACT

A method of 3D printing to achieve a desired surface quality on at least one surface of a 3D printed object comprising selecting a base surface having the desired surface quality; and printing the 3D printed object on the base surface, so that the desired surface quality is imparted to one surface of the 3D printed object during printing. The surface quality may be glassiness, roughness, smoothness and texture in general. Objects may thus be manufactured in which electronic components are integrated in or under a glass-like surface.

11 Claims, 12 Drawing Sheets

(51) Int. Cl.
  *B29C 64/393*  (2017.01)
  *B33Y 10/00*  (2015.01)
  *B33Y 30/00*  (2015.01)
  *B33Y 50/02*  (2015.01)
  *B33Y 70/00*  (2020.01)
  *B33Y 80/00*  (2015.01)
  *B29L 31/34*  (2006.01)

(52) U.S. Cl.
  CPC ............... *B33Y 10/00* (2014.12); *B33Y 30/00* (2014.12); *B33Y 50/02* (2014.12); *B33Y 70/00* (2014.12); *B33Y 80/00* (2014.12); *B29K 2995/0025* (2013.01); *B29L 2031/34* (2013.01)

(56) References Cited

U.S. PATENT DOCUMENTS

| | | | |
|---|---|---|---|
| 8,491,083 B2* | 7/2013 | Boday | B33Y 30/00 347/20 |
| 9,827,713 B1* | 11/2017 | Linnell | B29C 64/124 |
| 9,840,045 B2* | 12/2017 | Linnell | B33Y 30/00 |
| 10,118,343 B1* | 11/2018 | Linnell | B29C 64/245 |
| 10,363,706 B2* | 7/2019 | Lu | B29C 64/40 |
| 10,667,403 B2* | 5/2020 | Suzuki | H05K 3/0014 |
| 2004/0175450 A1* | 9/2004 | Yanagisawa | B33Y 10/00 425/135 |
| 2006/0035034 A1* | 2/2006 | Matsumoto | B42D 25/333 427/487 |
| 2006/0158456 A1* | 7/2006 | Zinniel | B33Y 70/00 345/589 |
| 2007/0071902 A1* | 3/2007 | Dietrich | B29C 64/106 427/407.1 |
| 2008/0174050 A1* | 7/2008 | Kikuchi | B29C 64/124 264/401 |
| 2009/0177309 A1 | 7/2009 | Kozlak | |
| 2009/0304952 A1* | 12/2009 | Kritchman | B33Y 10/00 427/256 |
| 2009/0309267 A1* | 12/2009 | Boot | B29C 64/135 425/117 |
| 2011/0241947 A1* | 10/2011 | Scott | B22F 10/66 428/156 |
| 2012/0046779 A1* | 2/2012 | Pax | B33Y 10/00 700/118 |
| 2014/0358273 A1* | 12/2014 | LaBossiere | B29C 64/118 700/119 |
| 2015/0037527 A1 | 2/2015 | Jacobs et al. | |
| 2015/0258734 A1* | 9/2015 | Okamoto | G06K 19/07749 425/500 |
| 2015/0273757 A1* | 10/2015 | Pforte | B29C 65/48 428/172 |
| 2016/0121548 A1* | 5/2016 | Nauka | B29C 64/40 425/375 |
| 2016/0198576 A1* | 7/2016 | Lewis | B29C 64/106 361/761 |
| 2016/0288413 A1* | 10/2016 | Yakubov | B33Y 30/00 |
| 2017/0001377 A1* | 1/2017 | Meisner | B29C 64/209 |
| 2017/0120532 A1* | 5/2017 | Kozlak | B33Y 40/20 |
| 2017/0297111 A1* | 10/2017 | Myerberg | B28B 1/001 |
| 2018/0186058 A1 | 7/2018 | Buesgen et al. | |

FOREIGN PATENT DOCUMENTS

| | | | | |
|---|---|---|---|---|
| DE | 102014201121 A1 * | 7/2015 | | B29C 64/171 |
| EP | 2815872 | 12/2014 | | |
| JP | 2015-189238 | 11/2015 | | |
| JP | 2016-531027 | 10/2016 | | |
| JP | 2017-528347 | 9/2017 | | |
| WO | WO-2005002833 A1 * | 1/2005 | | B29C 64/135 |
| WO | WO 2005/037529 | 4/2005 | | |
| WO | WO-2011086450 A2 * | 7/2011 | | B29C 64/135 |
| WO | WO 2016/044837 | 3/2016 | | |
| WO | WO-2016042657 A1 * | 3/2016 | | B22F 3/105 |
| WO | WO 2017/001325 | 1/2017 | | |
| WO | WO 2019/130294 | 7/2019 | | |

OTHER PUBLICATIONS

Berschauer, WO-2016042657-A1, "Manufacturing apparatus for manufacturing electronic device, has control unit that moves stage to working position of modeling and mounting units for laminating electrically equipped apparatus on stage according to determined path", Clarivate Analytics, Mar. 24, 2016, entire (Year: 2016).*

Fujita, DE-102014201121-A1, "Electronic functional component for micro-electromechanical system, has electronic component arranged on base element, and functional layer formed on base element by the three dimensional printing process", Clarivate Analytics, Jul. 23, 2015, entire document (Year: 2023).*

Meyer Tool, https://www.mtm-inc.com/understanding-surface-finish-and-surface-texture.html, retrieved Nov. 28, 2023 (Year: 2023).*

Communication Pursuant to Article 94(3) EPC Dated Jun. 8, 2022 From the European Patent Office Re. Application No. 18836298.2. (5 Pages).

International Preliminary Report on Patentability Dated Jul. 9, 2020 From the International Bureau of WIPO Re. Application No. PCT/IL2018/051364. (14 Pages).

International Search Report and the Written Opinion Dated Jun. 5, 2019 From the International Searching Authority Re. Application No. PCT/IL2018/051364. (23 Pages).

Invitation to Pay Additional Fees, Communication Relating to the Results of the Partial International Search and the Provisional Opinion Dated Apr. 1, 2019 From the International Searching Authority Re. Application No. PCT/IL2018/051364. (12 Pages).

Notice of Reason(s) for Rejection Dated Oct. 4, 2022 From the Japan Patent Office Re. Application No. 2020-536802.and its Translation Into English. (15 Pages).

Office Action Dated Oct. 31, 2023 From the Israel Patent Office Re. Application No. 275771. (4 Pages).

* cited by examiner

3D PRINTING TO OBTAIN A PREDEFINED SURFACE QUALITY

RELATED APPLICATION APPLICATIONS

This application is a National Phase of PCT Patent Application No. PCT/IL2018/051364 having International filing date of Dec. 17, 2018, which claims the benefit of priority under 35 USC § 119(e) of U.S. Provisional Patent Application No. 62/612,454 filed on Dec. 31, 2017. The contents of the above applications are all incorporated by reference as if fully set forth herein in their entirety.

FIELD AND BACKGROUND OF THE INVENTION

The present invention, in some embodiments thereof, relates to use of 3D printing or additive manufacturing when a predefined surface quality is required.

3D printing or additive manufacturing is a fast-growing technology that is good for prototyping and for small scale manufacturing, but is difficult to use on a large scale or to produce consumer products, due to slowness of the manufacturing process.

An additional issue with additive manufacturing is that high levels of surface quality are difficult to guarantee due to intrinsic limitations of the additive manufacturing method.

Thus various methods of applying a finish to a 3D printed object are known. The finishes may be processes that smooth or roughen the surface, or layers of paint or varnish may be applied. However, all of these are applied after printing as post processing and are not intrinsic to the object itself.

The present embodiments address the issue of overcoming limitations of additive manufacturing in order to produce surfaces of specified qualities that are intrinsic to the 3D printed object and indeed to the 3D printing process.

SUMMARY OF THE INVENTION

The first or bottom layer of printing tends to have an external, i.e. bottom surface that shows as a negative of the surface on which it is printed. The present embodiments may thus relate to providing a base surface having predefined qualities, and then printing the 3D object on that base surface, so that the object surface facing the base surface reflects the qualities of the base surface upon which it was printed.

Embodiments may involve selecting substances for the base that minimize capillary forces of the jetted printing material.

According to an aspect of some embodiments of the present invention there is provided there is provided a method of 3D printing to achieve a predetermined surface quality on at least one surface of a 3D printed object. The method comprises selecting a base surface having the predetermined surface quality; and printing the 3D printed object on the base surface, so that the predetermined surface quality is imparted to one surface of the 3D printed object during the printing.

According to some embodiments of the invention the method comprises selecting the base surface to minimize capillary forces of a jetting material.

According to some embodiments of the invention the method comprises printing a 3D object on the base surface with a rigid opaque photopolymer.

According to some embodiments of the invention the method comprises reorienting the object after printing so that the surface having the predetermined surface quality and printed over the base surface faces upward or outward.

According to some embodiments of the invention the method comprises placing electronic components at predetermined locations on the base surface and printing the 3D object in layers around and over the electronic components, such that the electronic components are integrated in the 3D object, and a surface surrounding the electronic components has the predetermined surface quality.

According to some embodiments of the invention the method comprises marking the predetermined locations on the base surface prior to the placing.

According to some embodiments of the invention the marking comprises printing printed marks at the predetermined locations.

According to some embodiments of the invention the method comprises the placement is by a robotic arm.

According to some embodiments of the invention the method comprises identifying locations of the marks using a sensing system, and operating the robotic arm based on the identification for placing the electronic components at the marks.

According to some embodiments of the invention the method comprises identifying locations of the electronic components, following the placement, using a sensing system, comparing the identified locations to the predetermined locations, and issuing an alert signal when a mismatch between the identified locations and the predetermined locations is above a predetermined threshold.

According to some embodiments of the invention the method comprises identifying locations of the electronic components, following the placement, using a sensing system, comparing the identified locations to the predetermined locations, and adjusting computer object data describing the 3D object based on the comparison.

According to an aspect of some embodiments of the present invention there is provided apparatus for additive manufacturing of an object having a predetermined surface quality on at least one surface. The apparatus comprises a build tray, a printing head comprising print nozzles for layerwise printing of an object, and a base placed on the build tray. The base optionally and preferably comprises a substance having the predetermined surface quality, to allow printing the object on the substance and imparting the surface quality to a first printed layer of the object.

According to some embodiments of the invention the apparatus comprises a robotic arm configured for placing electronic components at predetermined locations on the base, and a controller for controlling the printing head to execute the layerwise printing around and over the electronic components, such that the electronic components are integrated in the 3D object, and a surface surrounding the electronic components has the predetermined surface quality.

According to some embodiments of the invention the apparatus comprises a sensing system configured for identifying locations of electronic components placed on the base prior to the layerwise printing.

According to some embodiments of the invention the apparatus comprises a controller configured for comparing the identified locations to predetermined locations, and issuing an alert signal when a mismatch between the identified locations and the predetermined locations is above a predetermined threshold.

According to some embodiments of the invention the apparatus comprises a controller configured for comparing the identified locations to predetermined locations, and adjusting computer object data describing the 3D object based on the comparison.

According to an aspect of some embodiments of the present invention there is provided a 3D printed object having a plurality of surfaces, one of the surfaces having a predetermined surface quality, wherein the one of the surfaces comprises an imprint of a base, the base being selected with the predetermined surface quality for imparting to the 3D printed object.

According to some embodiments of the invention the predetermined surface quality comprises one member of the group consisting of: a texture, a surface roughness, a smoothness and a glassiness.

According to some embodiments of the invention the base comprises one member of the group consisting of: glass, polyimide, anodized aluminum and polycarbonate.

According to some embodiments of the invention the 3D object is printed with a rigid opaque photopolymer.

According to some embodiments of the invention 3D is orientated so that a surface having the predetermined surface quality faces upward or outward.

According to some embodiments of the invention the 3D printed object comprises electronic components, the surface having the predetermined surface quality surrounding the electronic components.

According to some embodiments of the invention the 3D printed object comprises a first outer surface containing the electronic components, and a second outer surface that does not contain electronic components, wherein the first outer surface is made at least in part of a first polymeric material characterized by a glass transition temperature of at least 70° C., and wherein the second outer surface is made at least in part of a second polymeric material characterized by a glass transition temperature of from about 40° C. to about 70° C.

According to some embodiments of the invention the 3D printed object is printed on the base, the base being a substance on a print tray, such that a first printed layer of the 3D object is printed on the base to attain the surface quality from the base.

According to some embodiments of the invention the 3D printed object the base is selected to have a surface energy optimized for allowing transfer of surface texture to the first printed layer.

Unless otherwise defined, all technical and/or scientific terms used herein have the same meaning as commonly understood by one of ordinary skill in the art to which the invention pertains. Although methods and materials or substances similar or equivalent to those described herein can be used in the practice or testing of embodiments of the invention, exemplary methods, substances and/or materials are described below. In case of conflict, the patent specification, including definitions, will control. In addition, the materials, substances, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system according to some embodiments of the invention;

DESCRIPTION OF SPECIFIC EMBODIMENTS OF THE INVENTION

Figure 1A:
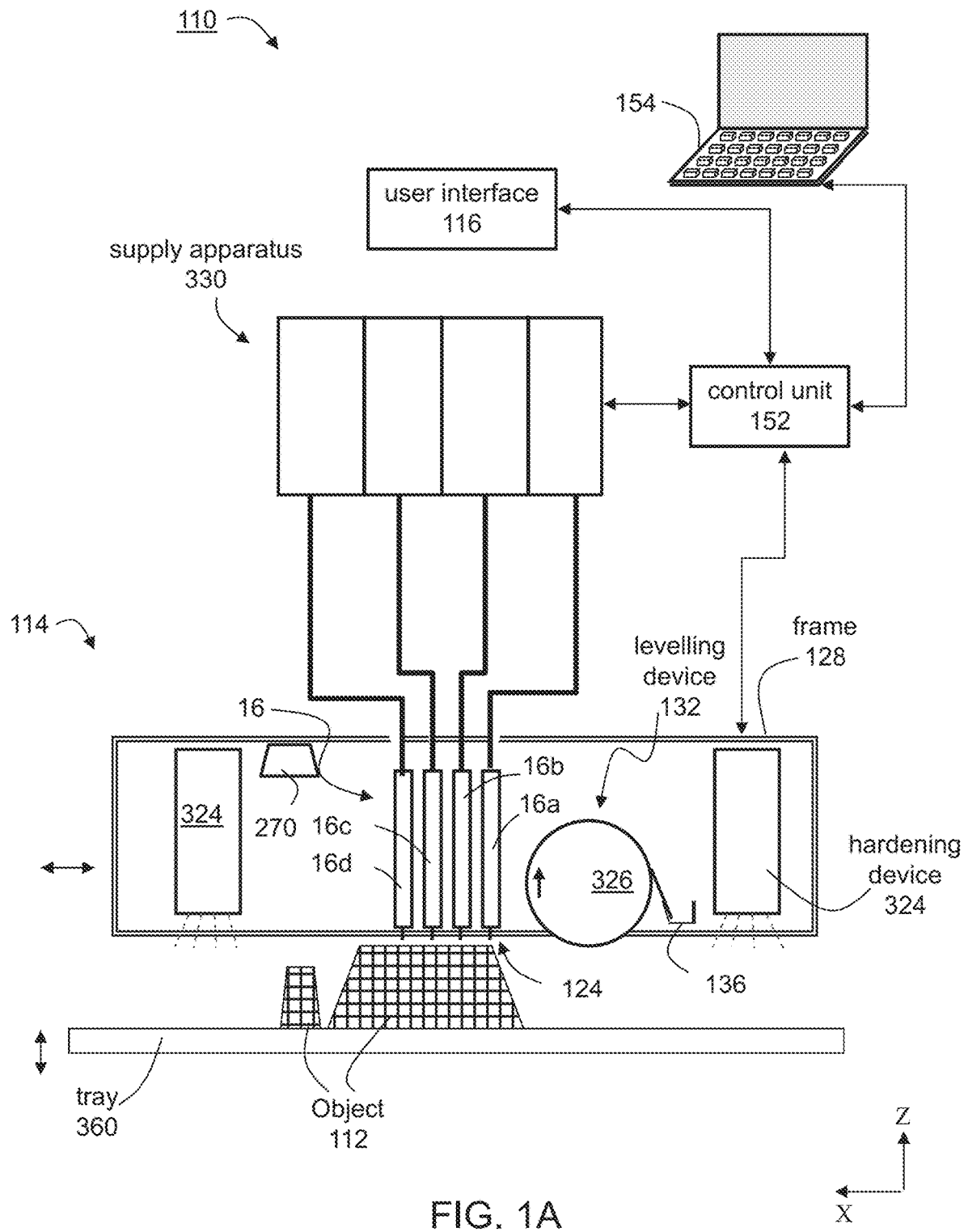

The present invention, in some embodiments thereof, relates to use of 3D printing or additive manufacturing when a predefined surface quality is required.

The present embodiments may provide a method and apparatus for 3D printing to achieve a desired surface quality on at least one surface of a 3D printed object. The method involves selecting a base surface having the desired surface quality; and printing the 3D printed object on the base surface, so that the desired surface quality is imparted to the down-facing surface of the 3D printed object during the printing. The surface quality may be glassiness, roughness, smoothness and texture in general. Objects may thus be manufactured in which printed components are integrated in a glassy surface.

When printing layer by layer, as long as contact between the first layer of the object being printed and the base surface is sufficient, any vertical property (e.g., grooves, relief) of a pattern formed on the down-facing surface of the object being printed turns out as a negative of the vertical property of a pattern on the surface or substance on which it is printed. Thus, if a surface quality such as for example glassiness is desired, the object may be built upside-down on a glassy surface and in this way the surface quality of the upside/upper surface of the object when inverted after printing will be a negative of the glassy surface, i.e. have a glass grade or glassy surface quality. Glassiness may be replaced with any other texture to provide a desired quality or texture of the bottom surface of the 3D object. Examples of substances that can be used for providing a desired quality or texture to a bottom surface of the 3D object may include, without limitation, polyimide, anodized aluminium, glass and polycarbonate.

An exemplary application involves printing around and over electronic components, to provide a smooth glass-quality surface with integrated electronic components. A preferred substance for use as a base for printing would be a substance with optimum surface energy so as to reduce the capillary force of the jetted droplets, such for example that jetted/dispensed material does not spread and seep under the electronic components placed on the tray. For the same consideration, it is desirable to select a base surface on the basis of a consideration of contact angle of the droplet at the drop/substance surface interface. In some embodiments, the substance of the base surface is chosen so that it displays a typical surface energy of less than 1000 dynes/cm or less than 500 dynes/cm or less than 100 dynes/cm or less than 50 dynes/cm, e.g., from about 10 dynes/cm to about 50 dynes/cm.

The substance of the base surface may be chosen so that the contact angle between a drop of the modelling material formulation and the base surface is above 30 degrees, or above 40 degrees, or above 50 degrees, or above 60 degrees, or above 70 degrees, when measured at room temperature about 1 second after the drop contacts the base surface.

Embodiments may involve selecting substances that minimize the capillary forces of the jetted printing material as aforesaid, so that the jetted material will form well on the base surface, around the electronic components, and the entire down-facing surface of the object will acquire the surface properties of the base surface. Thus in one embodiment polycarbonate may be used as a base surface that is effective in reducing capillary forces of the jetted material. Polycarbonate is an example of providing a suitable surface energy of the base surface, although other examples are possible, and different substances may be more or less suitable depending on the jetted printing material being used.

The 3D object may be printed with a pre-defined base surface to provide specific texture or properties to at least part of its bottom layer surface and then rotated or inverted for use after printing, so that the 3D printed surface that faced the base during printing now becomes the main surface of the object, and the object now has the surface qualities desired on its main, typically upper, surface. Often it is the upper surface that has the designated surface quality requirements so that in general, objects according to the present embodiments are printed upside down and subsequently inverted for use.

The method and system of the present embodiments form three-dimensional objects based on computer object data in a layerwise manner by forming a plurality of layers in a configured pattern corresponding to the shape of the object. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having a set of nozzles to deposit building material formulation in layers on a supporting structure. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different dispensing head of the AM. The material formulations are optionally and preferably deposited in layers during the same pass of the printing heads. The material formulations and combination of material formulations within the layer are selected according to the desired properties of the object.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2A:
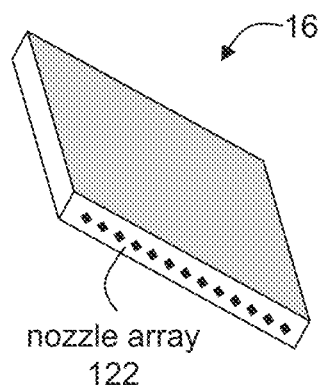
FIGS. 2A-2C are schematic illustrations of printing heads according to some embodiments of the present invention.
Figure 2B:
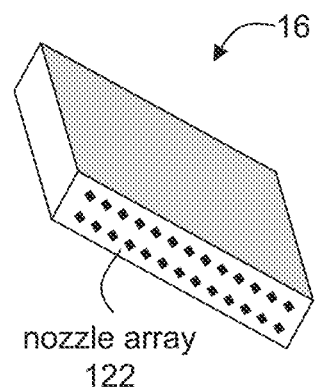
Figure 2C:
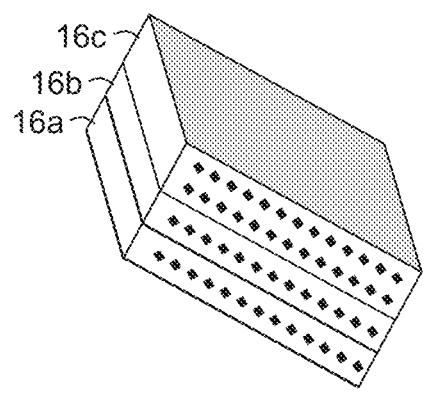

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via a building material formulation reservoir which may optionally include a temperature control unit (e.g., a temperature sensor and/or a heating device), and a material formulation level sensor. To dispense the building material formulation, a voltage signal is applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, $\alpha$, between the maximal dispensing rate of the support material formulation and the maximal dispensing rate of modeling material formulation. The value of the predetermined ratio, $\alpha$, is preferably selected to ensure that in each formed layer, the height of modeling material formulation equals the height of support material formulation. Typical values for $\alpha$ are from about 0.6 to about 1.5.

As used herein the term "about" refers to ±10%.

For example, for $\alpha=1$, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that $M \times m \times p = S \times s \times q$. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 340 controls the voltage applied to each dispensing head or nozzle array and the temperature of the building material formulation in the respective printing head.

Once the manufacturing data is loaded to control unit 340 it can operate without user intervention. In some embodiments, control unit 340 receives additional input from the operator, e.g., using data processor 154 or using a user interface 116 communicating with unit 340. User interface 116 can be of any type known in the art, such as, but not limited to, a keyboard, a touch screen and the like. For example, control unit 340 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
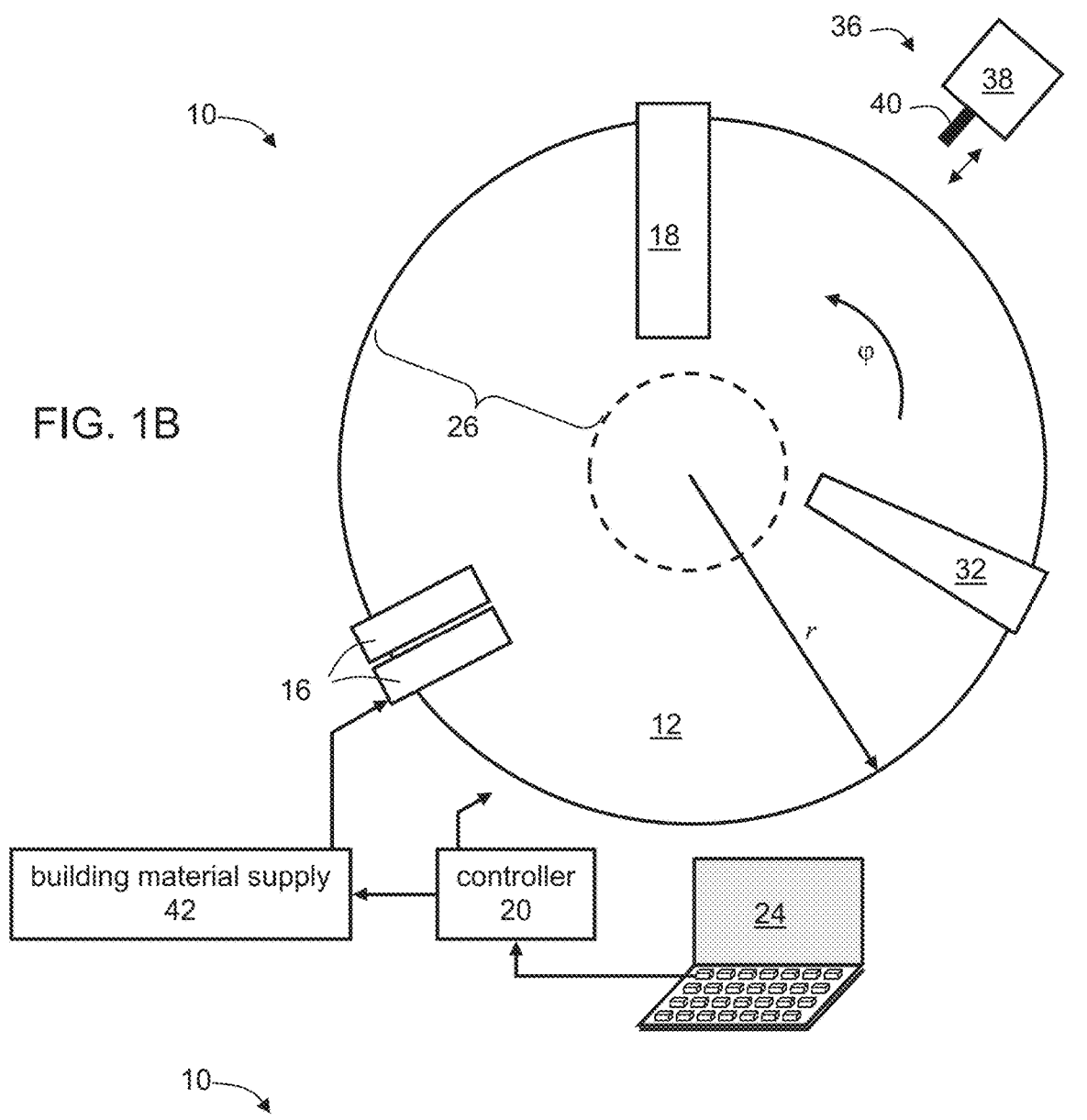
Figure 1C:
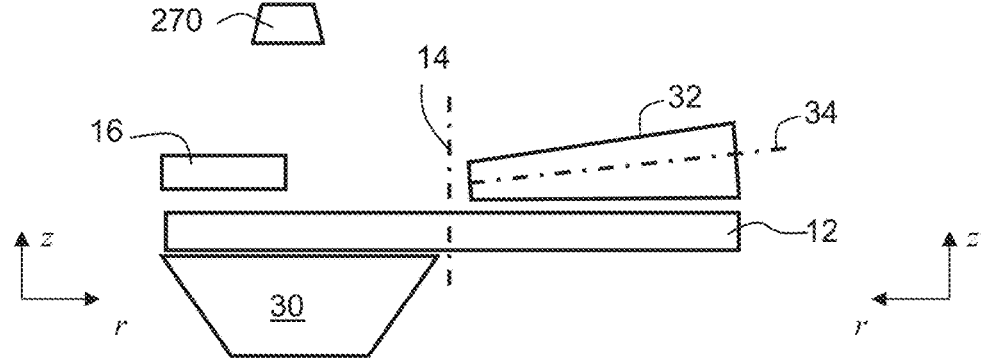
Figure 1D:
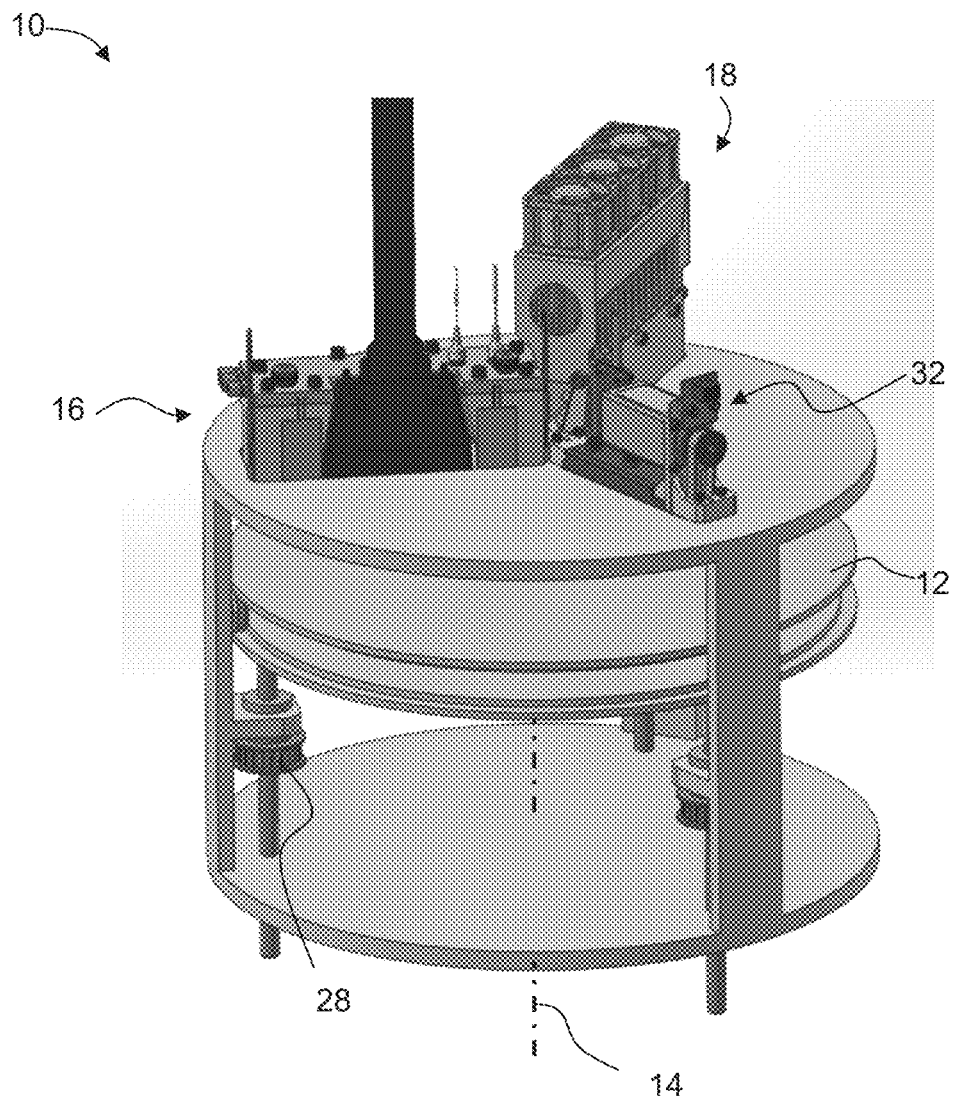

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction j, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $j_1$, and another head can be oriented radially and positioned at azimuthal position $j_2$. In this example, the azimuthal offset between the two heads is $j_1$-$j_2$, and the angle between the linear nozzle arrays of the two heads is also $j_1$-$j_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
FIGS. 3A and 3B are schematic illustrations demonstrating coordinate transformations according to some embodiments of the present invention.
Figure 3B:
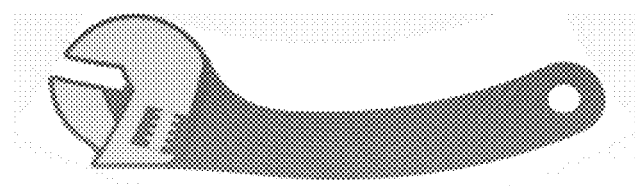

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_{11}$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Figure 4:
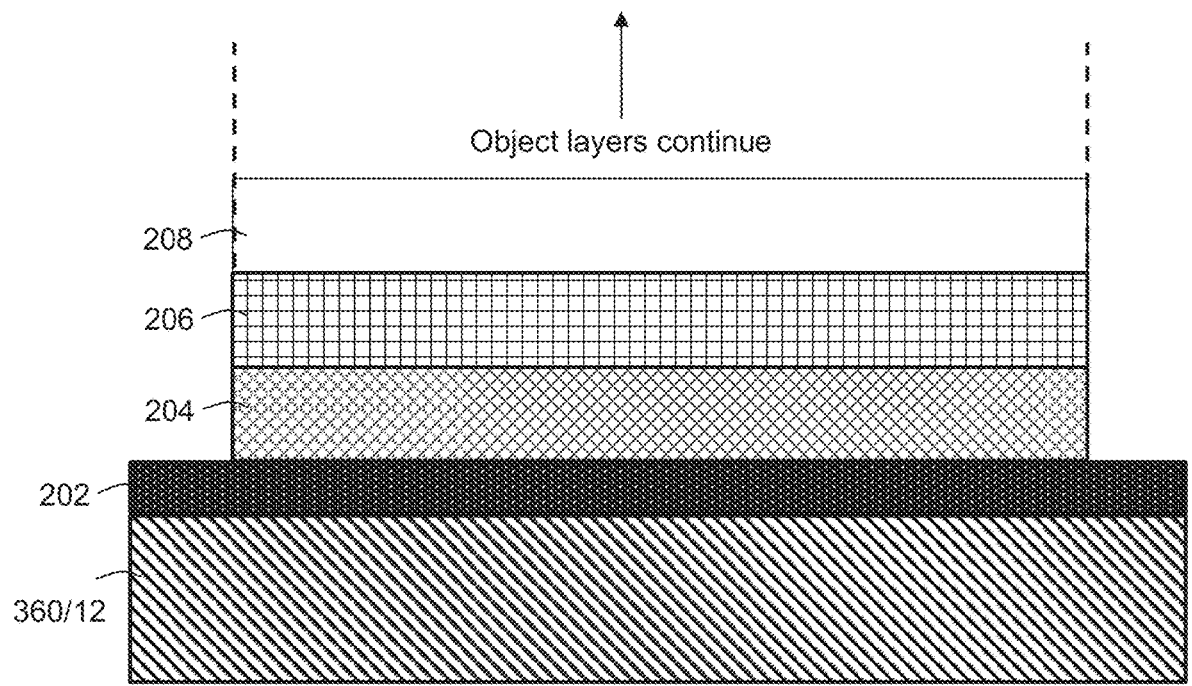
FIG. 4 is a simplified diagram showing a printing tray with a base surface and an object being printed on the base surface according to an embodiment of the present invention.

Reference is now made to FIG. 4 which is a simplified schematic illustration of an embodiment of the present invention. A 3D object is printed on a build tray or printing tray 360 or 12. The tray is lined with a base surface 202 which is selected to have the surface property desired for the object. Base surface 202 may for example be attached to the tray using an adhesive such as a double-sided adhesive. A first layer of the object 204 is then printed on the base surface. The bottom of layer 204 then takes on the surface properties of the base substance, and will typically form the upper surface of the object after the printing process is complete and the object is inverted. Additional object layers 206, 208, etc. are then printed over the first object layer. Once printed, the object may be rotated or inverted so that the first layer printed provides the outer facing or upper facing surface of the object.

Figure 5:
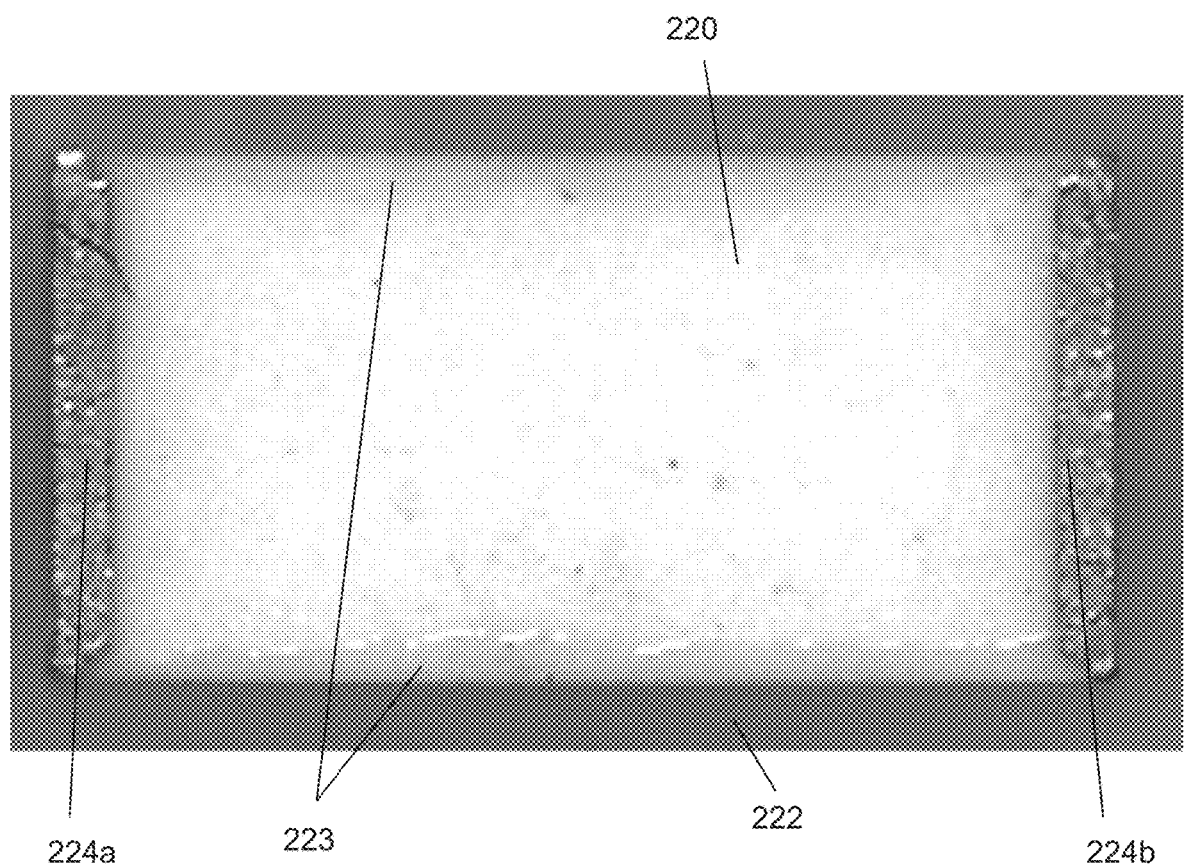
FIG. 5 is an example of an electronic component embedded in a 3D printed object with a glassy surface produced according to the embodiment of FIG. 4.

Reference is now made to FIG. 5, which is an enlarged photographic image illustrating an example of an electronic component 220 embedded in a 3D printed object 222 with a surface having a predetermined surface quality, in this case a glass-like quality, obtained by being an imprint of the base surface upon which it was printed. Furthermore, some embodiments of the present invention significantly reduce the amount of modeling material formulation 223 seeping under and spreading over the visible surface of the electronic component 220 (and its electrical terminals 224a and 224b) while printing object 222.

More generally, the surface quality may be any of a texture, a surface roughness, a smoothness or as in FIG. 5, glass-like smoothness.

The term glass-like refers to a smooth surface with glass texture look and feel.

Suitable substances for the base surface include glass, polyimides, anodized aluminum and polycarbonate. In the experiment shown in FIG. 5, the substance of the base surface was polycarbonate.

Figure 6:
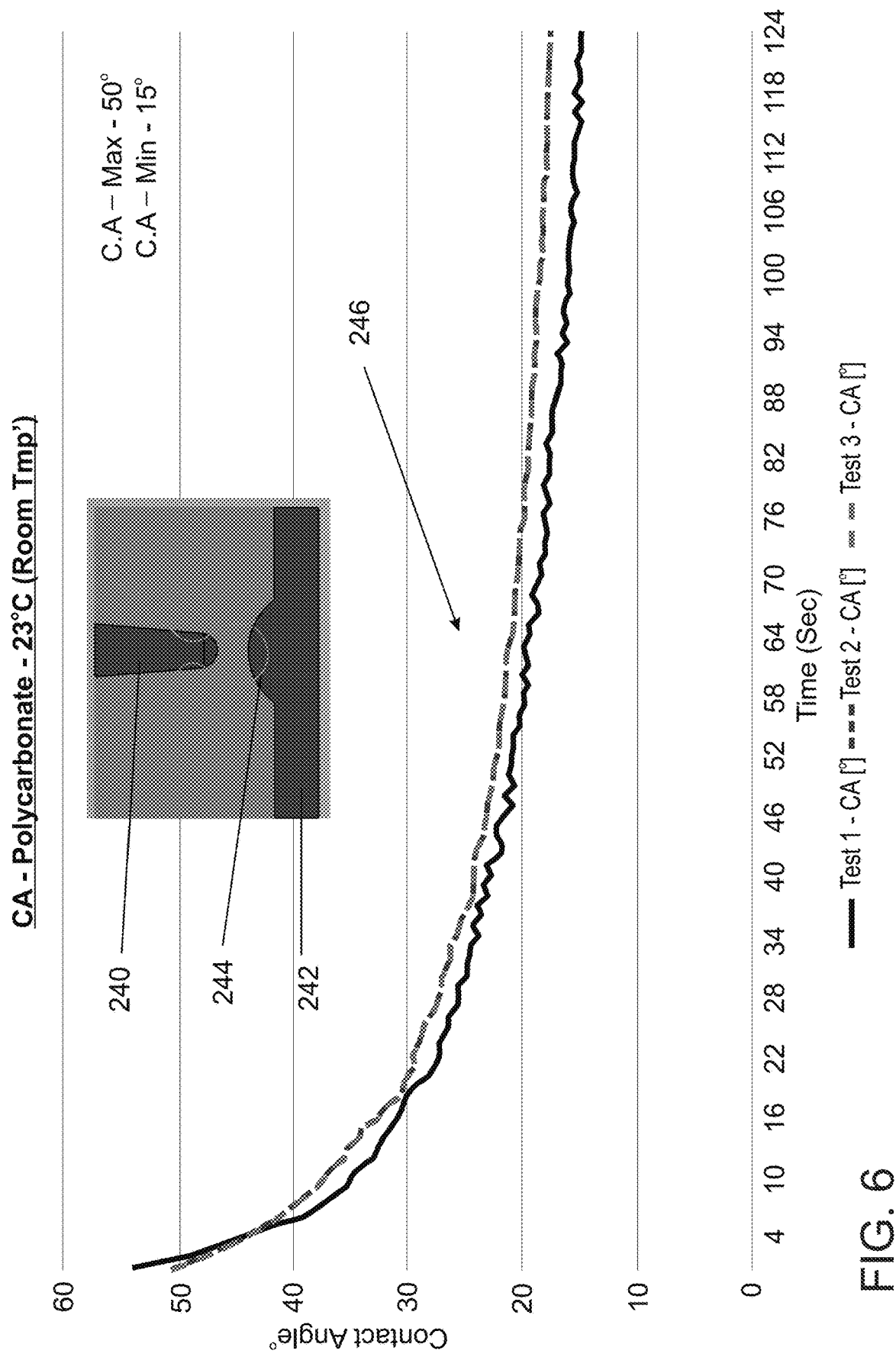
FIG. 6 is a simplified diagram and graph showing the effect of contact angle where polycarbonate is used as the base surface according to the present embodiments.

Reference is now made to FIG. 6, which shows more experimental results when polycarbonate is used as the base surface. As shown in the inset, a nozzle 240 jets a drop of modeling material formulation towards a polycarbonate surface 242. The drop lands on the polycarbonate 242 to take on the shape 244. Surface tension forces influence the way the drop spreads over the polycarbonate and a low surface tension allows the drop to spread and settle on the surface, taking on the qualities of the surface. Graph 246 shows contact angle over time after the drop lands on the polycarbonate. The graph relates to a test carried out at room temperature, however it is noted that contact angles can be manipulated by varying the temperature inside the printing chamber. The angle of contact depends on the interaction of base surface and printing material.

Typical materials for 3D printing include photopolymers. An exemplary photopolymer material for use in the embodiments of the invention is a rigid opaque photopolymer, such as RGD531™ (Stratasys Ltd., Israel).

In some embodiments, the object is fabricated by depositing both a material belonging to a first type of materials that are characterized by a Tg of 70° C. or more, and a material belonging to a second type of materials that is characterized by a Tg of from about 40° C. to about 70° C. This embodiment is particularly advantageous for fabricating an object in which one or more electronic components are embedded. A material belonging to the first type of materials is optionally and preferably deposited at the outer layer of the object, preferably at an outer region or surface of the object in which one or more electronic components may be placed. This improves the thermal stability of this surface, and facilitates deposition of conductive materials or lines on or over the surface (optional), a process that oftentimes requires elevated temperatures. Yet, since objects fabricated using materials having relatively high Tg tend to experience geometric distortions, such as curling, the second type of materials is used in conjunction with the first type of material, to reduce the likelihood of such distortions. Typically, the material belonging to the second type of materials is deposited at inner regions of the objects and at outer regions that do not contain electronic components.

In some embodiments of the present invention the material belonging to a first type of materials has other physiochemical characteristics that may improve its compatibility with the conductive fabrication process, for example having specific surface tension, metal adhesion promoters or other functional groups, and specific thermal conductivity.

Herein throughout, "Tg" refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

In use, the object can be orientated, for example, so that the surface to which the defined surface quality has been applied faces upward or outward. That is to say in general the defined surface quality is for the principle surface of the object as it is to be used.

Figure 7:
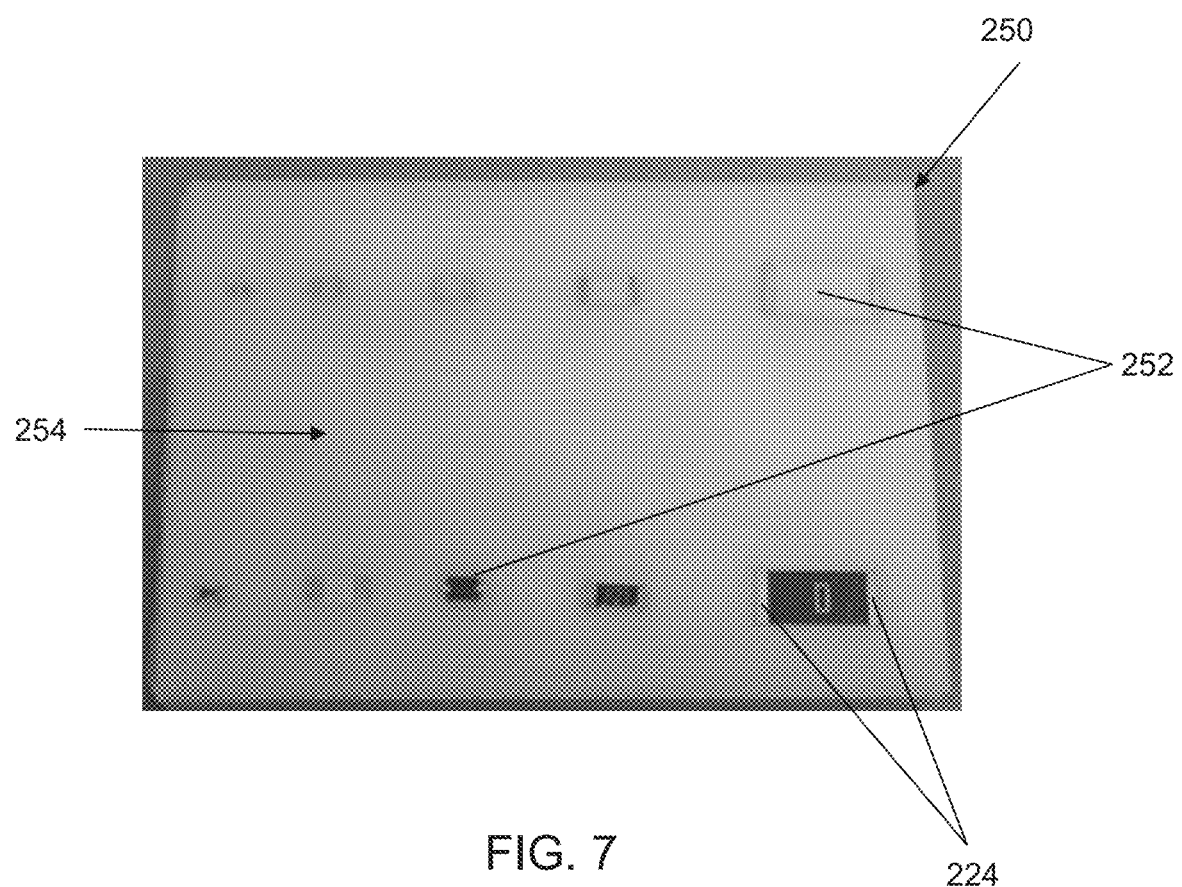
FIG. 7 is an image of a 3D object with electronic components integrated in an object having a glassy surface.

Reference is now made to FIG. 7, which illustrates an exemplary product 250 made according to the present embodiments. A 3D structure contains electronic components 252 with functional electrical terminals 224 (e.g. not covered by modeling material formulation), that are integrated in a printed object (e.g. plastic board) having a surface 254 with glass-like smoothness, to allow further post-processing such as printing or placing of conductive ink lines between the integrated electronic components. The electronic components are first placed, manually or by a dedicated automatization system, e.g. a robot or robots, on a base surface which is attached to the printing tray 360 or 12 and then one or more printing materials are selectively jetted in layers around and above the electronic components. After printing, the object is removed from the print tray and the glassy side comprising the electronic components is oriented as necessary for use, for example inverted.

Figure 8A:
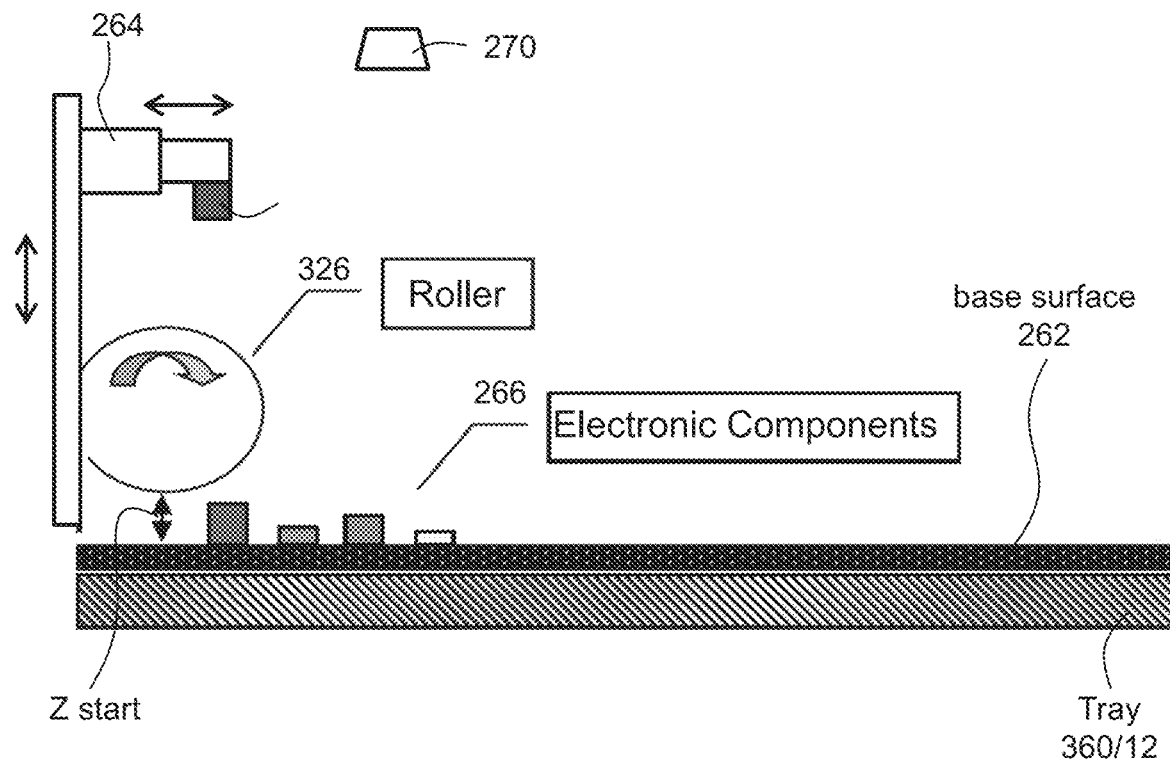
FIGS. 8A and 8B are simplified schematic diagrams showing stages in printing of the object of FIG. 7.
Figure 8B:
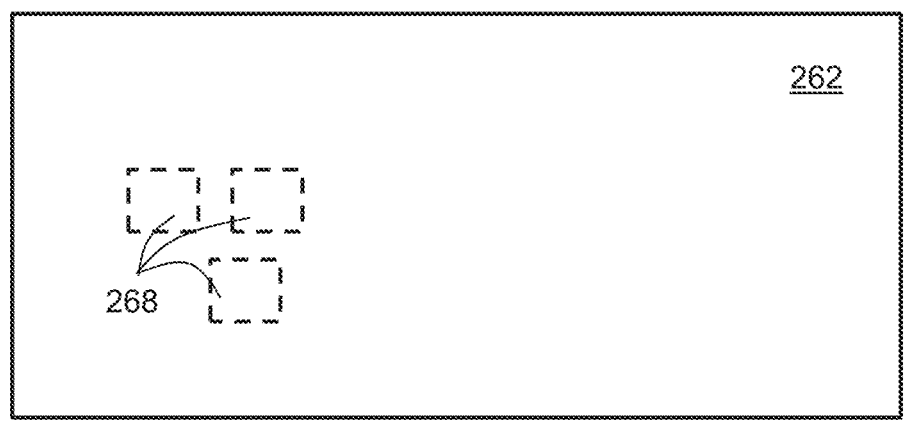

Reference is now made to FIGS. 8A and 8B, which are simplified schematic diagrams illustrating the manufacture of a product such as shown in FIG. 7, on a base surface, for example, using system 110 or 10. Print tray 360 or 12 has, holds, or is covered by a base surface 262. The base surface has the surface property, e.g. glassy, that one desires to impart to the object's down-facing surface during printing. In some embodiments of the present invention the substance of the base surface 262 comprises polycarbonate, and in some embodiments of the present invention the substance is polycarbonate. In some embodiments, the print tray 360 or 12 may be a polycarbonate plate. The base surface may comprise a film, e.g. polycarbonate film, or be covered or coated by a film, e.g. polycarbonate film. The electronic components 266 are placed (e.g. manually or by a robotic arm 264) on the base surface 262, or film (not shown) on base surface 262. The film typically has a thickness that is less than 0.1 mm. Electronic components 266 may optionally be fixed to the base surface or film by an adhesive, such as, but not limited to, a glue or wax, to avoid accidental movements thereof.

In an embodiment of the invention the electronic components are placed on the base surface or film within the printing chamber of the 3D printing system.

Alternatively, the electronic components can be placed on the base surface or film outside the printing chamber, and then transferred with the base surface or film into the printing chamber. This process may be facilitated when the printing system comprises a removable tray. In that case, the base surface or film can be disposed on the tray outside the printing chamber, and the electronic components can be placed on the base surface or film while the tray is still outside the chamber. Thereafter, the tray, with the base surface or film and the electronic components, can be introduced back into the printing chamber.

A first layer (not shown; see 204 in FIG. 4) is then printed by selectively jetting materials onto the base 262 or film, around the electronic components 266. The Z start position of the inkjet print heads is calibrated to be higher than the highest electronic component. Further layers of selectively jetted materials are deposited around and subsequently above the electronic components 266 until the 3D object is printed. Preferably, roller 326 or 32 is initially deactivated, e.g., during deposition of the first few layers, at least up to the height of the first layer deposited above the largest electronic component (in Z direction), so as not to cause damage to electronic components 266.

In some embodiments, the computer object data used by the 3D printing system (e.g., system 10 or 110) also include data (preferably 3D data) pertaining to the locations of the electronic components 266. The computer object data can comprise, for example, an assembly of data files, with one or more data files describing the object to be printed, and one or more data files describing the locations of the electronic components to be placed on the base surface or film, and thereafter integrated with the printed object. The data files can be in any of the aforementioned known formats.

Optionally, material deposition by the 3D printing system is initially targeted only to the areas that do not contain the electronic components 266. Specifically, the deposited layers in parts of the 3D objects in which electronic components 266 are to be embedded are formed with voids at the location of electronic components 266. For example, suppose that the thickness of each deposited layer (following curing) is about 0.03 mm, and a height of a particular electronic component is about 0.21 mm. In this case, 7 layers are deposited with voids at the location of the particular electronic component. The lateral dimensions of each void are typically the same as the lateral dimension of the horizontal cross-section of the electronic component at the vertical location of the respective layer, with margins of from about 0.05 mm to about 0.2 mm.

Once the height of accumulated layers of material has surpassed the height of the highest electronic component, roller 326 or 32 may be started, to smooth each additional layer, e.g. by removing surplus material from each layer. The electric connectors of the electronic components are apparent on the down-facing surface of the just printed 3D object. The printed object may then be inverted and post-processing may be commenced, e.g. printing of conductive lines between the electrical components.

The placement of electronic components 266 is optionally preceded by a registration procedure that ensures that each electronic component 266 is placed at a predetermined horizontal location defined according to the planar (X-Y or r-φ) system-of-coordinates of the three-dimensional printing system. Typically, the registration procedure comprises marking the predetermined horizontal location on the base surface or film by a mark, where the location corresponds to the system-of-coordinates of the three-dimensional printing system. A representative example of marks 268 suitable for marking the horizontal locations of electronic components 266 is illustrated in FIG. 8B which is a top view of base surface 262 (or film, in embodiments in which such a film is employed). Marks 268 are used, for example, by robotic arm 264, for placing the components 266 at the locations of the marks. The marks can optionally be labeled so as to designate a specific mark to each electronic component. The marks may be temporary, including, without limitation, color or shape markers on the tray, rails, pins or holes placed or demarcated on the base surface.

Marks 268 can, in some embodiments of the present invention, be printed by the printing system on the base surface or film. When the marks are printed marks, the registration procedure optionally and preferably includes a build preparation stage, at which the printing system prints the marks at the locations at which the electronic components are to be placed. The locations of the marks to be printed can be extracted from the computer object data pertaining to the locations of the electronic components (e.g., by projection of the 3D data on a plane engaged by the tray).

In some embodiments of the present invention, the printing system (e.g., system 10 or 110) comprises a sensing system 270, such as, but not limited to, an optical sensing system (e.g., a camera supplemented by an image processor, or an optical scanner, or the like), configured for identifying marks 268. The controller of the printing system (e.g., controller 152 or controller 20) can receive the coordinates of the locations of the marks from sensing system 270 and control robotic arm 264 to move to each location and place the respective component thereat.

The coordinates from sensing system 270 can also be used by the controller for ensuring that the layers of the 3D object are deposited around and subsequently above the electronic components 266 as further detailed hereinabove. In cases in which the marks are printed by the 3D printing system, it is not necessary to receive coordinates from sensing system 270 for the purpose of the printing process, since these coordinates were used by the 3D printing system for printing the marks, and so are typically already stored in the memory of the 3D printing system.

Also contemplated, are embodiments in which the sensing system is activated after the electronic components are placed, and is used to identify the components and their respective locations, expressed in the system-of-coordinates of the 3D printing system. The advantage of such identification is that it allows detecting errors in the locations of the electronic components (occurring, e.g., during the placement of the components or due to movement/s of the components after placement).

Thus, in some embodiments of the present invention the computer or the controller receives the coordinates of the components from the sensing system, and compares them to the locations in the computer object data. When a mismatch between the coordinates received from the sensing system and the location in the computer object data is detected, the controller can issue an alert signal (e.g., an error message), for example, using the user interface 116, allowing the operator to take actions to correct the error, continue fabrication if the mismatch is within an acceptable range, or cease the process.

In some embodiments of the present invention the computer object data of the object to be fabricated are adjusted, optionally and preferably by the computer (e.g., computer 24 or 154) based on the coordinates received from the sensing system. Typically, the computer object data are adjusted when a mismatch between the coordinates received from the sensing system and the location in the computer object data is detected. In such a case, the computer object data are adjusted to shift and/or rotate the data at an amount or to a degree that at least partially compensates for the mismatch. Computer object data adjustment may include, without limitation, adjustment of the number of layers that maintain voids at the location of the electronic component, and the location and/or lateral dimensions and/or orientation of the void in each layer. When a mismatch is detected for more than one electronic component, the computer object data are preferably adjusted to minimize a cost function describing the combination of all detected mismatches.

Figure 9:
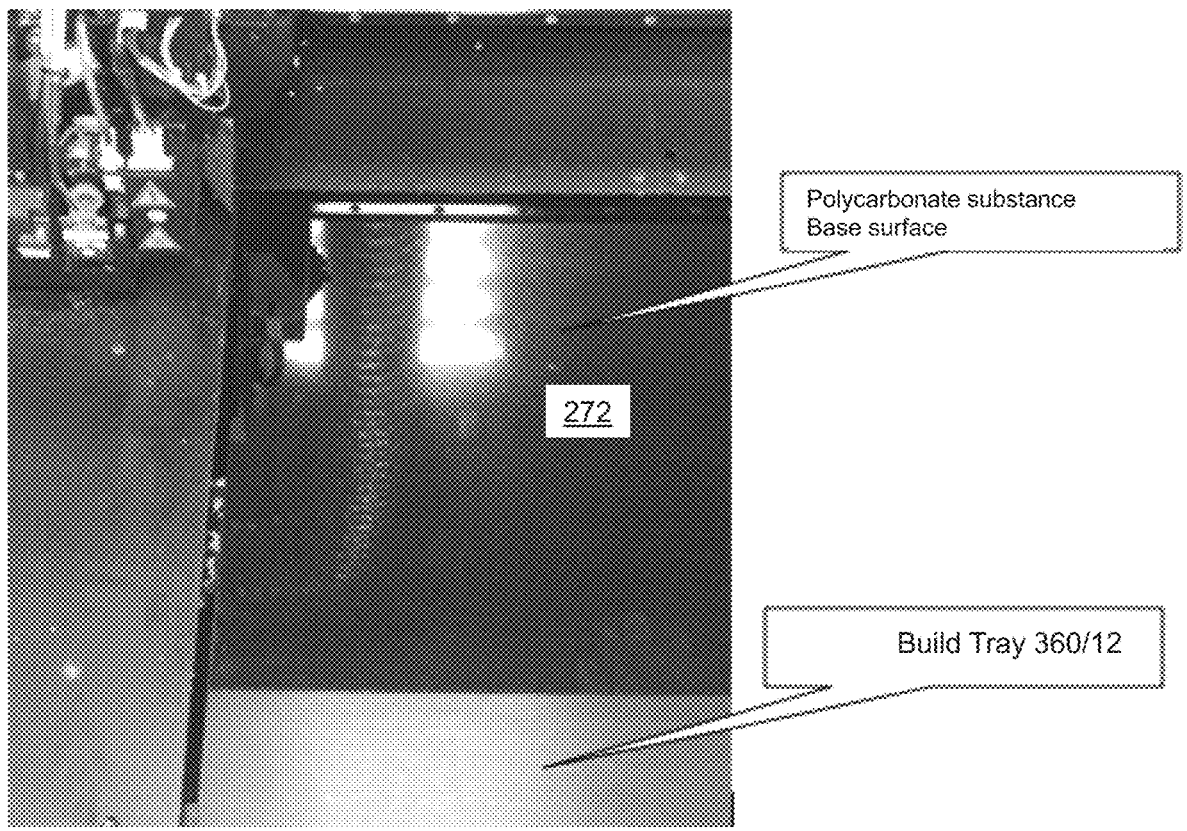
FIG. 9 illustrates a lining of polycarbonate substance placed on a print or build tray according to embodiments of the present invention.

Reference is now made to FIG. 9, which shows a print tray or build tray 360 or 12 of a 3D printer according to the present embodiments. On the build tray 360 or 12, a layer, plate and/or film of polycarbonate substance having a glassy texture is attached to provide base 272 upon which the object may be printed.

Figure 10A:
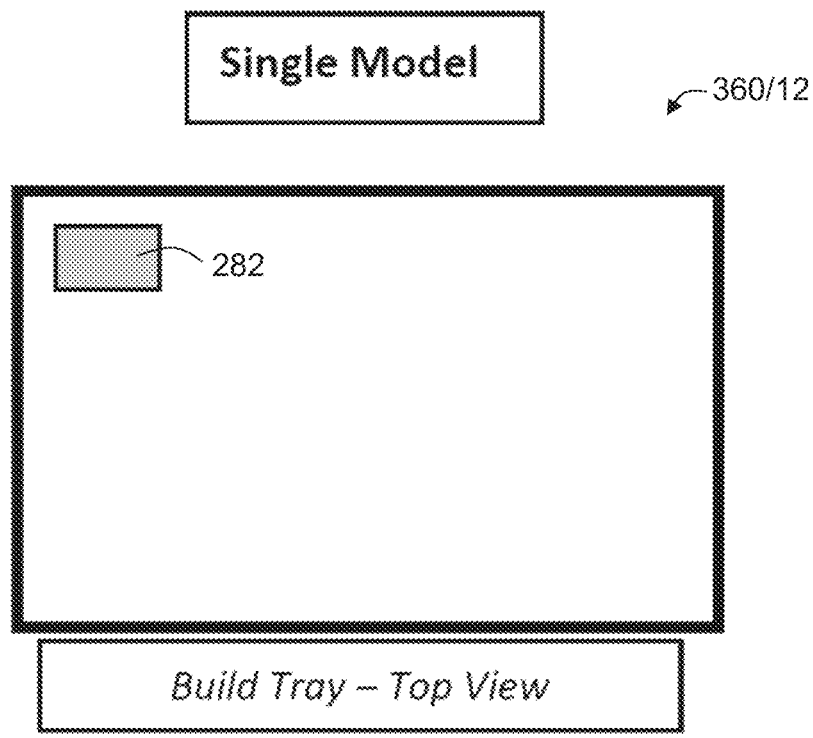
FIGS. 10A and 10B are views from above with single and multiple objects requiring the same surface texture according to the present embodiments being printed together.
Figure 10B:
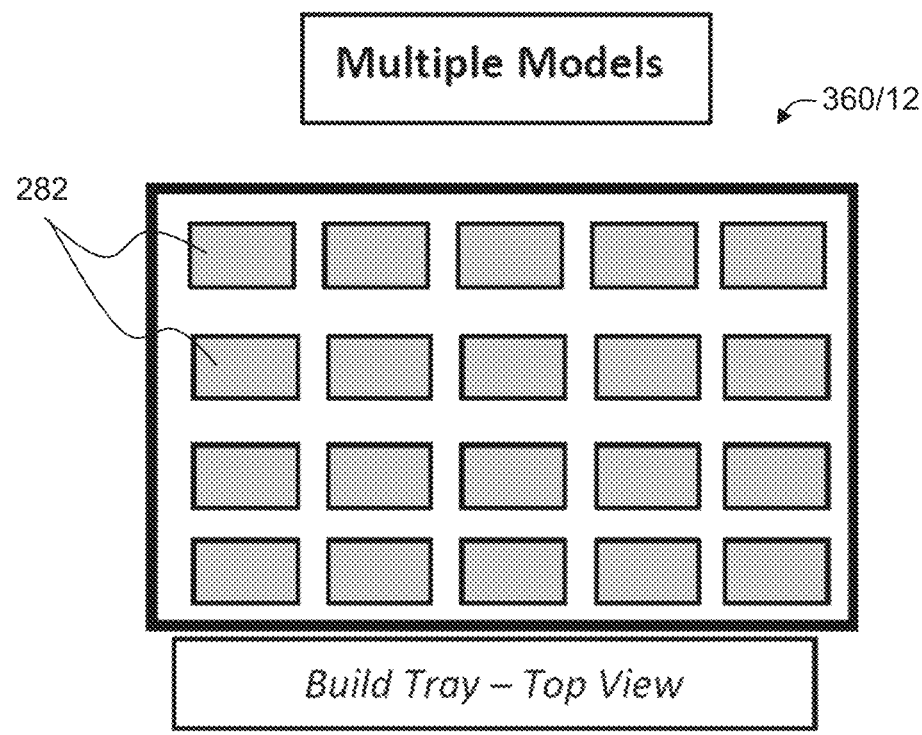

Reference is now made to FIGS. 10A and 10B, which are simplified diagrams showing layouts of objects to be printed on a print tray. For multiple objects that can fit together on a print tray, a single base can be used to print a plurality of objects at the same time, i.e. in the same printing process. FIG. 10A shows a top view of a print tray 360 or 12 on which a single object 282 is printed. FIG. 10B shows the same print tray, on which 20 objects are printed on the same base.

Figure 11:
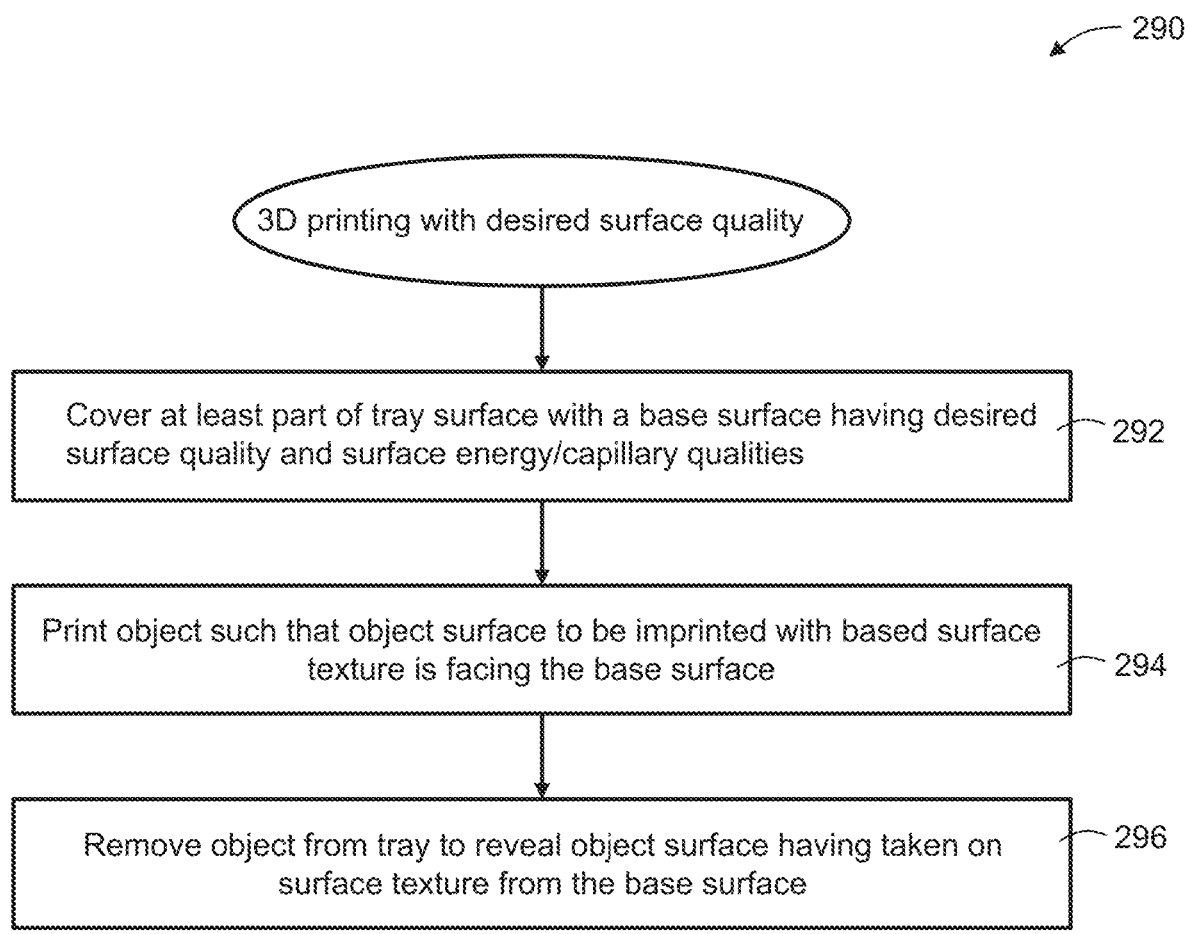
FIG. 11 is a simplified flow chart showing a method of printing an object with a desired surface quality according to embodiments of the present invention.

Reference is now made to FIG. 11, which is a simplified flow diagram showing an exemplary method 290 of 3D printing to achieve a predetermined surface quality on at least one surface of a 3D printed object. The method involves covering or lining 292 a tray surface or part thereof with a base surface having desired surface quality and surface energy/capillary qualities. The substance may be selected according to the surface quality or texture desired to be exhibited by a surface, e.g. upper surface of the object to be printed, such as smoothness, roughness, glassiness, etc., and/or desired surface qualities such as surface energy, capillary forces, and so on.

The object is then printed 294 such that the object surface to be defined is facing the selected base surface, i.e. the down-facing first layer of the object is formed on the base and the base surface quality, property, texture or imprint of the base surface is imparted to the first printed layer.

The object is then removed 296 to reveal the object's surface having taken on the surface texture from the base surface. Typically, but not necessarily, the surface of the first printed layer is used or exhibited as the principle surface of the object, for example, the upper surface or the surface on view or to be utilized.

Generally, the desired object surface comes out as a negative of the substance on which the first layer/s of the object was printed, that is to say of the surface forming a base for the printing. Thus, if the desired surface quality is for example glass grade smoothness—printing of the 3D object may be commenced on a base having a glassy surface texture. If the desired quality is roughness then a base with a rough surface is provided and the roughness is imparted to the object surface first printed.

In this way the surface quality of the down-facing side of the 3D object during printing will be glassy or rough as the case may be, i.e., the first layer surface that is printed is the negative of the glass or rough etc. base surface.

It is expected that during the life of a patent maturing from this application many relevant forms of 3D printing or additive manufacturing and printing inks or jetting materials and potential base surfaces or substances and suitable surface textures will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of 3D printing, the method comprising:
lining a tray of a 3D printing system with a base surface;
following said lining of said tray, placing electronic components at predetermined locations on said base surface,
printing layers of an object on said base surface in reversed order to build said object in a down-facing orientation, so that a surface property selected from the group consisting of smoothness, roughness, or texture of said base surface is imparted during said printing to a layer printed onto said base surface to form a top surface of said 3D object, wherein said printing comprises printing layers around and over said electronic components, such that said electronic components are integrated in said 3D object, and a surface surrounding said electronic components has said predetermined surface quality and
removing said object from said base surface to reveal said printed layer forming said top surface having taken said surface property from said base surface;
wherein said lining is executed before printing and said removing is executed after printing.

2. The method of claim 1, wherein said base surface comprises one member of the group consisting of: glass, polyimide, anodized aluminum and polycarbonate.

3. The method of claim 1, comprising printing a 3D object on said base surface with a photopolymer.

4. The method of claim 1, comprising marking said predetermined locations on said base surface prior to said placing.

5. The method of claim 4, wherein said marking said predetermined locations comprises printing marks at said predetermined locations.

6. The method of claim 1, wherein said placing is by a robotic arm.

7. The method of claim 5, wherein said placing is by a robotic arm.

8. The method of claim 7, comprising identifying locations of said marks using a sensing system, and operating said robotic arm based on said identification for placing said electronic components at said marks.

9. The method of claim 1, comprising identifying locations of said electronic components, following said placement, using a sensing system, comparing said identified locations to said predetermined locations, and issuing an alert signal when a mismatch between said identified locations and said predetermined locations is above a predetermined threshold.

10. The method of claim 1, comprising identifying locations of said electronic components, following said placement, using a sensing system, comparing said identified locations to said predetermined locations, and adjusting computer object data describing said 3D object based on said comparison.

11. The method according to claim 1, wherein said 3D printing system comprising a roller which follows a path of a dispensing head dispensing material to form said layers and which removes excess material so as to straighten newly formed layers prior to formation of successive layers thereon, and the method comprises initially deactivating said roller during deposition of layers up to a height of a first layer deposited above a highest of said electronic components.

* * * * *